United States Patent
Miki

(10) Patent No.: US 6,675,088 B2
(45) Date of Patent: Jan. 6, 2004

(54) VEHICLE IDLING STOP CONTROL APPARATUS

(75) Inventor: Akira Miki, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 39 days.

(21) Appl. No.: 10/192,645

(22) Filed: Jul. 11, 2002

(65) Prior Publication Data

US 2003/0014178 A1 Jan. 16, 2003

(30) Foreign Application Priority Data

Jul. 16, 2001 (JP) ........................................ 2001-215498

(51) Int. Cl.⁷ .............................. F02D 9/00; F02D 29/02
(52) U.S. Cl. ................................. 701/112; 123/198 DB; 123/339.16
(58) Field of Search .................................. 701/112, 102; 123/198 D, 198 DB, 179.4, 339.1, 339.16

(56) References Cited

U.S. PATENT DOCUMENTS

| 6,363,906 B1 | * | 4/2002 | Thompson et al. | ... 123/198 DB |
| 6,540,644 B2 | * | 4/2003 | Morimoto et al. | .......... 477/102 |
| 6,595,180 B2 | * | 7/2003 | Thompson et al. | ... 123/198 DB |
| 2002/0033157 A1 | * | 3/2002 | Thompson et al. | ...... 123/179.4 |

FOREIGN PATENT DOCUMENTS

| JP | 8-61110 | | 3/1996 | |
| JP | 9-166047 | * | 6/1997 | ............ F02M/3/06 |
| JP | 10-47105 | | 2/1998 | |

* cited by examiner

*Primary Examiner*—Hieu T. Vo
(74) *Attorney, Agent, or Firm*—Oliff & Berridge, PLC

(57) ABSTRACT

As a vehicle runs, current load $q(t)$ is calculated every given time. The current load $q(t)$ can be calculated by multiplying the amount of air taken into an engine of the vehicle by the engine speed. Added-up load $Q(t)$ can be found by adding up the current load $q(t)$ according to expression of $Q(t)=Q(t-1)+((q(t)-Q(t-1))/a)$. If the added-up load $Q(t)$ exceeds an inhibition determination value $Z$, idling stop is inhibited, so that overheating of the engine can be prevented appropriately.

4 Claims, 4 Drawing Sheets

VEHICLE IDLING STOP CONTROL APPARATUS

The present disclosure relates to the subject matter contained in Japanese Patent Application No. 2001-215498 filed on Jul. 16, 2001, which are incorporated herein by reference in its entirety.

BACKGROUND OF THE INVENTION

1. Field of the Invention

This invention relates to a vehicle idling stop control apparatus being installed in a vehicle comprising an engine of an internal combustion engine, such as an automobile, for controlling the idling state of the engine.

2. Description of the Related Art

Hitherto, an engine of an automobile has been set so as to continue driving in an idling state of low output even if the opening of a throttle valve is minimized by gas pedal operation. If the engine is stopped at the temporary stopping time, etc., of the vehicle, when operating the engine is restarted, restarting must be conducted, it takes time in operation, and it is feared that it may interfere with rapid starting of driving the vehicle. In such a vehicle, to stop the engine, the driver needs to perform operation to stop the engine, such as operating an ignition key switch. However, it also becomes important to enhance fuel economy in the vehicle to make the efficient use of energy, it becomes necessary to suppress exhaust gases from the environmental issue of preventing global warming, and a request is made not to perform unnecessary idling.

Although unnecessary idling can also be decreased by conscious operation of the vehicle user such as the driver, the load when the vehicle is driven is increased. Then, a system is realized wherein a computer is installed in a vehicle for controlling so as to stop unnecessary idling driving and automatically start when operating the engine is restarted. Related arts to such a system are disclosed in JP-A-8-61110 and JP-A-10-47105, for example.

JP-A-8-61110 discloses an art wherein an engine control apparatus for stopping an engine if the driver does not press down on a gas pedal for a given time or the vehicle speed is zero and restarting the engine if the driver presses down on the gas pedal is used to continue the idling state without stopping the engine when the vehicle stops because of waiting at traffic lights, etc. To make the determination, directional signals, vehicle angle, hill inclination, and the like are entered and if it is predicted that the vehicle will immediately start, the idling state is continued without stopping the engine. JP-A-8-61110 also describes an art wherein to predict whether or not the vehicle will immediately start, route information set in route search made by a navigation system is used and when the vehicle stops at an intersection, etc., it is predicted that the vehicle will immediately start.

JP-A-10-47105 discloses an art for controlling so as to automatically stop an engine if a predetermined engine stop condition becomes true while the engine installed in the vehicle is being operated and automatically start the engine if a predetermined engine start condition becomes true during the automatic stopping. In the related art, the magnitude of the electric load is determined based on the battery voltage and if the battery voltage lowers, the electric load is determined to be large and automatic stopping the engine is inhibited for preventing the electric amount charged in the battery from becoming insufficient, namely, preventing the battery from being dead.

The idling state of the engine contributes to cooling so that the engine does not overheat in continuous running, etc., under high load. Thus, a system for inhibiting stopping of idling when the temperature of cooling water is high is also designed. In JP-A-10-47105, in the second embodiment, the temperature of cooling water is detected by a water temperature sensor and the fact that the water temperature is equal to or greater than a predetermined value is one of the requirements for stopping the engine.

Although it is important to suppress idling of the engine, there is a fear of overheating if the engine is stopped when cooling is required. In the system wherein the cooling water temperature, etc., is detected and when the cooling water temperature, etc., is high, idling stop is inhibited, it is not predicted that the water temperature will rise after continuous running under high load. Thus, if the vehicle is stopped, the water temperature rises to an abnormal high temperature and it becomes necessary to restart the engine for cooling. If the state of an abnormal high temperature occurs repeatedly, an engine failure can occur at the worst.

In the related art described in JP-A-10-47105, the fact that the water temperature of the cooling water of the engine is low is one of the requirements for inhibiting stopping of idling. It is estimated that this measure is taken because it becomes difficult to start the engine if the cooling water temperature of the engine is too low. When the cooling water becomes a high temperature, idling stop is not inhibited and no measures against the state of an abnormal high temperature are taken.

SUMMARY OF THE INVENTION

It is an object of the invention to provide a vehicle idling stop control apparatus that can appropriately control idling stop of an engine.

According to the present invention, there is provided a vehicle idling stop control apparatus for controlling whether or not idling stop of an engine of a vehicle is to be inhibited. The vehicle idling stop control apparatus includes a load monitor unit for monitoring run load of the engine and calculating a run load history and a control unit for adding up the run load based on the run load history calculated by the load monitor unit and inhibiting idling stop when the added-up value exceeds a predetermined inhibition determination value.

According to the invention, the vehicle idling stop control apparatus includes the load monitor unit and the control unit to control whether or not operation is to be continued when the vehicle engine is in an idling state. The control unit adds up the run load based on the run load history calculated by the load monitor unit monitoring the run load of the engine and inhibits idling stop if the added-up value exceeds the predetermined inhibition determination value. If the run load continues to be high, idling stop is inhibited, so that the idling operation can be continued for promoting cooling of the engine for avoiding the state of an abnormal high temperature to prevent overheat. Since whether or not idling stop is to be inhibited is determined based on the added-up value of the run load, idling stop can be controlled appropriately in response to the necessity for cooling the engine.

According to the invention, the vehicle idling stop control apparatus further includes an inhibition indication unit for indicating that idling stop is being inhibited when operation of the engine is continued in a state in which idling stop is inhibited by the control unit.

According to the invention, the inhibition indication unit indicates that idling stop is being inhibited, so that the vehicle driver, etc., can understand that it is not incapability of stopping idling because of a system failure, etc., and the driver, etc., can be given no insecure feeling.

According to the invention, the vehicle idling stop control apparatus further includes a temperature sensor for detecting a temperature of a cooling fluid of the engine. The control unit is inputted the temperature of the cooling fluid detected by the temperature sensor and inhibits idling stop of the engine when it is predicted that the temperature will rise exceeding a preset upper limit temperature.

According to the invention, the temperature sensor detects the temperature of the cooling fluid such as engine cooling water and if it is predicted that the detected temperature will rise exceeding the predetermined upper limit temperature, idling stop of the engine is inhibited, so that even if the engine load rises, it can be made hard to enter the state of an abnormal high temperature.

DETAILED DESCRIPTION OF THE PREFERRED EMBODIMENTS

Figure 1:
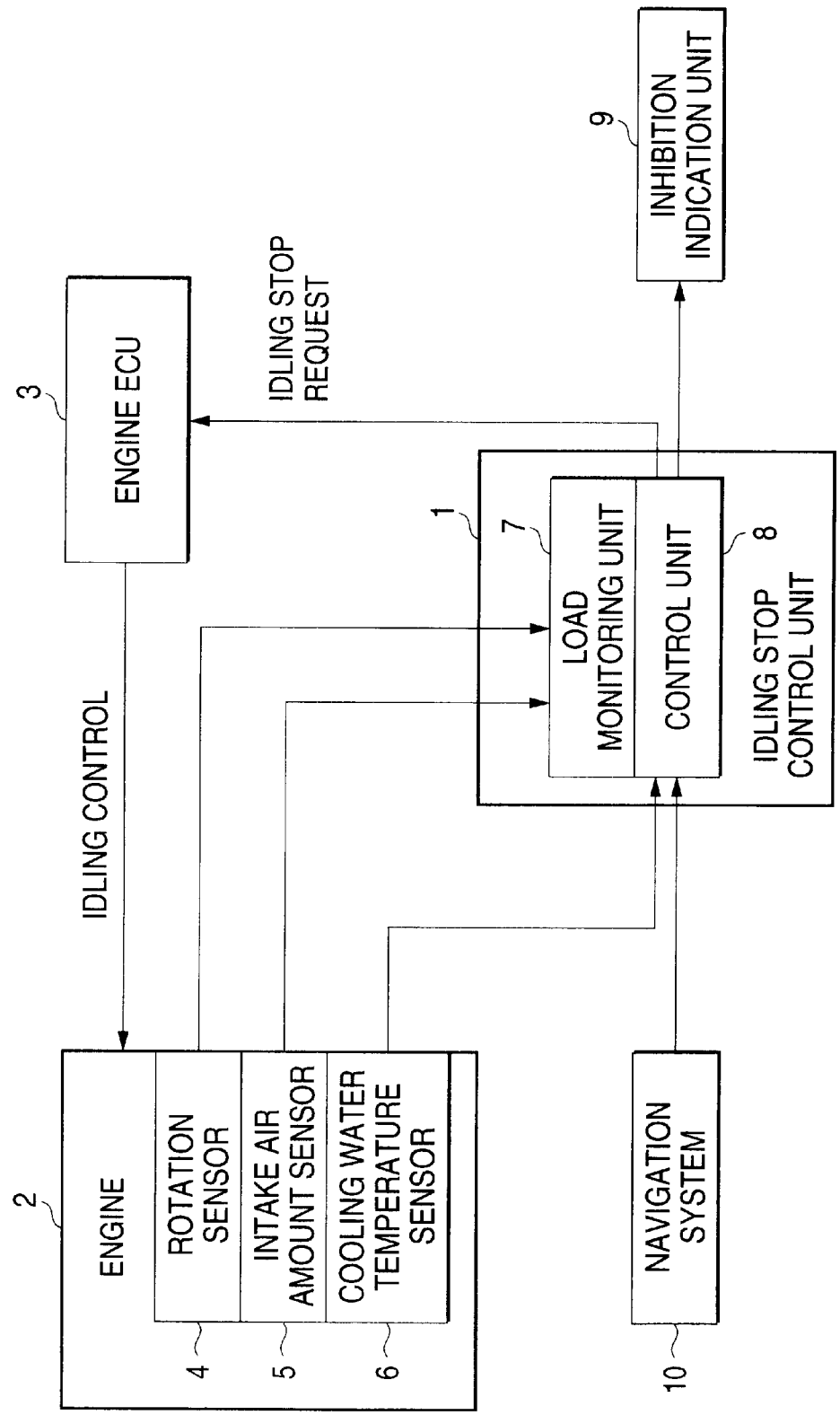
FIG. 1 is a block diagram to show a schematic electric configuration relevant to a vehicle idling stop control apparatus 1 of one embodiment of the invention.

FIG. 1 is a schematic electric configuration relevant to a vehicle idling stop control apparatus 1 of one embodiment of the invention. The vehicle idling stop control apparatus 1 controls whether or not an engine 2 continues to operate in an idling state. The engine 2 is controlled by an engine ECU 3 of an electronic control unit (ECU) for basic control about fuel injection, ignition, etc. To control the engine 2 by the engine ECU 3, the engine 2 is provided with a rotation sensor 4, an intake air amount sensor 5, a cooling water temperature sensor 6, and the like. The vehicle idling stop control apparatus 1 includes a load monitor unit 7 implemented by program operation of a microcomputer, etc., a control unit 8, and an inhibition indication unit 9. The load monitor unit 7 is inputted detection outputs from the rotation sensor 4 and the intake air amount sensor 5, monitors the run load of the engine, and calculates a run load history. The control unit 8 adds up the run load based on the run load history calculated by the load monitor unit 7 and when the added-up value exceeds a predetermined inhibition determination value, the control unit 8 inhibits idling stop.

The control unit 8 can control the inhibition indication unit 9 for indicating the state in which idling stop of the engine 2 is inhibited by light of a lamp, a sound, etc. The control unit 8 can also control inhibition of idling stop based on information of the cooling water temperature detected by the cooling water temperature sensor 6, the current position of the vehicle and the route provided by a navigation system 10, and the like.

Figure 2:
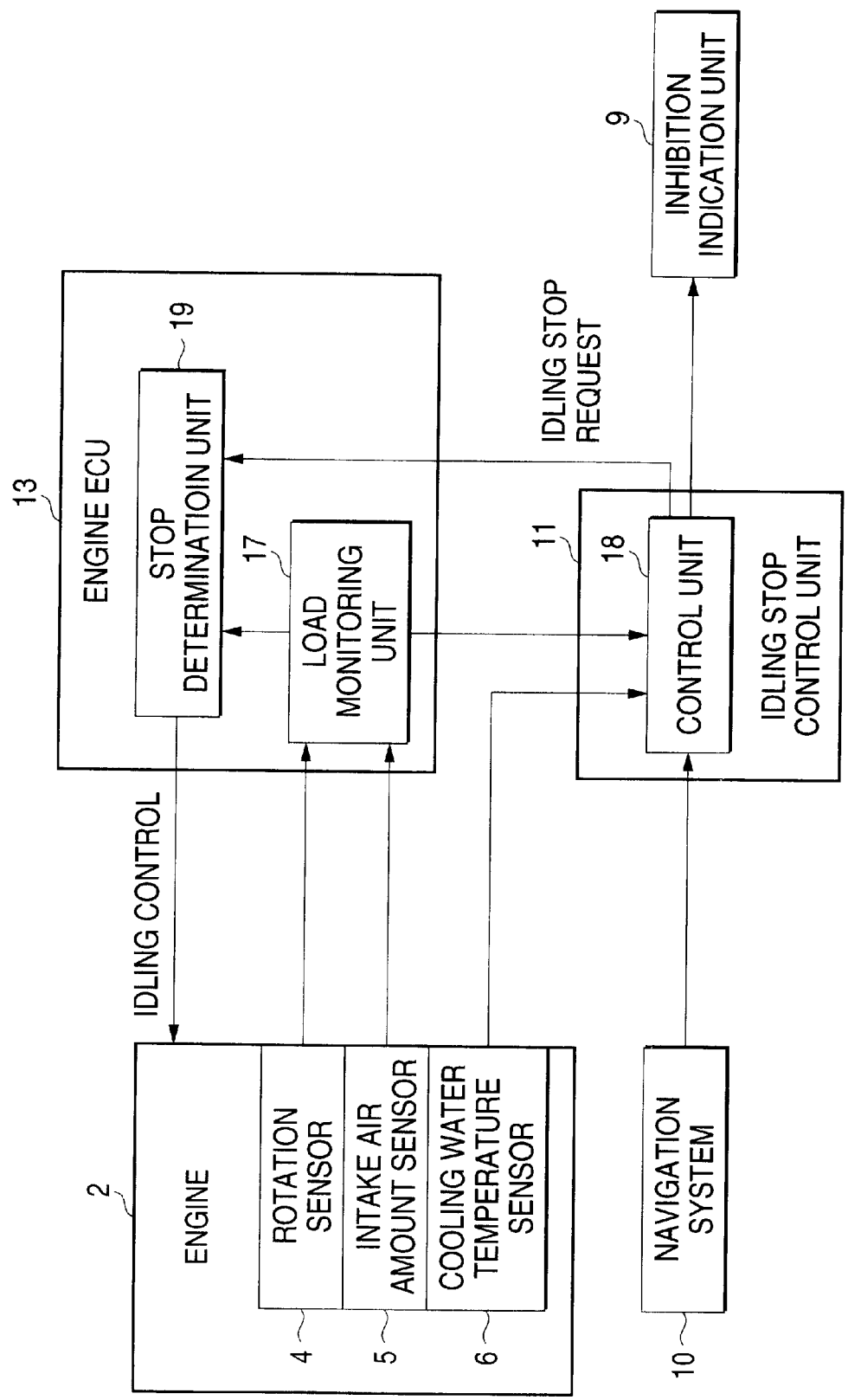
FIG. 2 is a block diagram to show a schematic electric configuration relevant to a vehicle idling stop control apparatus 11 of another embodiment of the invention.

FIG. 2 is a schematic electric configuration relevant to a vehicle idling stop control apparatus 11 of another embodiment of the invention. In the embodiment, parts similar to or identical with those previously described with reference to FIG. 1 are denoted by the same reference numerals in FIG. 2 and will not be discussed again. In the embodiment, an engine ECU 13 includes a load monitor unit 17. In FIG. 1, outputs of the rotation sensor 4 and the intake air amount sensor 5 are also fed into the engine ECU 3 for use to control the engine 2. In the embodiment, the function of the engine ECU 13 is used to implement the load monitor unit 17 and the monitor result is fed into control unit 18 of the idling stop control apparatus 11. From the control unit 18, an idling stop request is given to a stop determination unit 19 of the engine ECU 13, and the stop determination unit 19 determines whether or not idling stop is to be inhibited.

Figure 3:
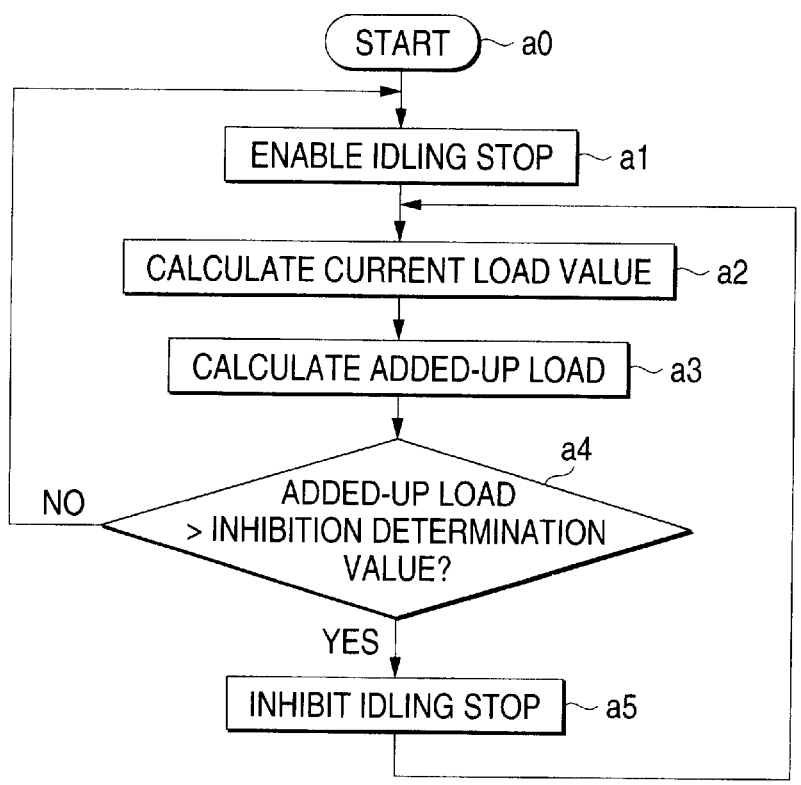
FIG. 3 is a flowchart to show an inhibition determination procedure of idling stop by control unit 8, 18 in FIGS. 1, 2.

FIG. 3 shows a control procedure in the vehicle idling stop control apparatus 1, 11 shown in FIGS. 1, 2. The procedure is started at step a0 and idling stop is enabled at step a1. At step a2, the load monitor unit 7, 17 calculates current load value q(t) according to expression (1) shown below, for example, every second. The engine speed is the number of revolutions per second, namely, the rotation speed.

$$q(t) = \text{intake air amount} \times \text{engine speed} \quad (1)$$

At step a3, added-up load Q(t) is calculated according to expression (2). Q(t−1) denotes added-up load up to one second before. "a" is a smoothing constant.

$$Q(t) = Q(t-1) + ((q(t) - Q(t-1))/a) \quad (2)$$

At step a4, whether or not the added-up load Q(t) is greater than a preset inhibition determination value Z is determined. If it is not determined that the load is greater than the preset value, control returns to step a1. If it is determined at step a4 that the added-up load Q(t) is greater than the inhibition determination value Z, idling stop is inhibited at step a5 and control returns to step a2. The procedure of steps a1 to a5 is thus repeated for controlling idling stop.

Figure 4:
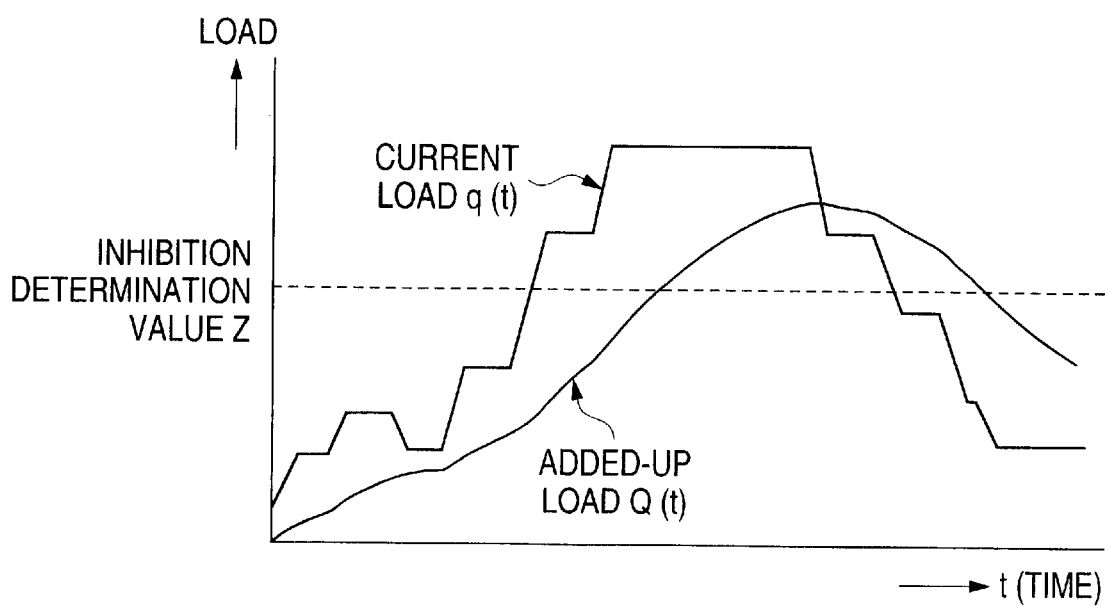
FIG. 4 is a graph to show the relationship between run load and idling stop inhibition determination according to the embodiments in FIGS. 1 and 2.

FIG. 4 shows change in the current load q(t) and the added-up load Q(t) when a vehicle goes up a hill, etc., for example. There is a possibility of overheating in the range in which the added-up load Q(t) exceeds the inhibition determination value Z and therefore idling stop can be inhibited for prompting cooling the engine 2 by idling.

Figure 5:
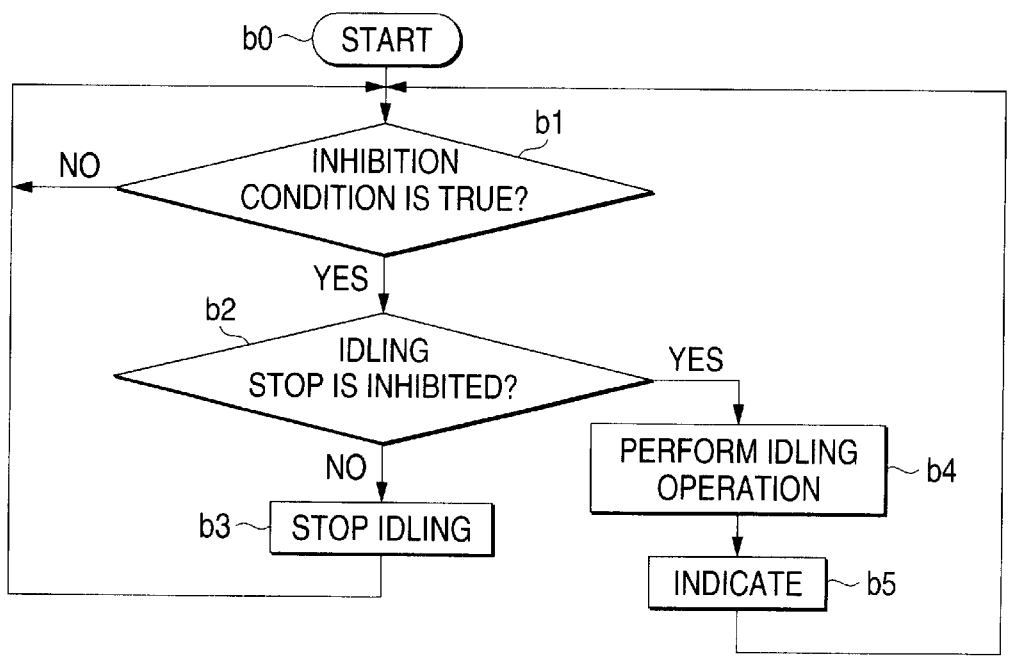
FIG. 5 is a flowchart to show an idling control procedure by the control unit 8, 18 in FIGS. 1, 2.

FIG. 5 shows an idling control procedure of the engine 2 by the control unit 8, 18 in the embodiment shown in FIGS. 1, 2. The procedure is started at step b0. At step b1, whether or not the idling condition of the engine 2 is true is determined. Continuation of the state in which the gas pedal is not operated and the vehicle speed is zero, for example, can be set as the idling condition. If the idling condition is not true at step b1, determination is repeated until the idling condition becomes true. If the idling condition is true, whether or not idling stop is inhibited is determined at step b2. When idling stop is enabled in the procedure in FIG. 3, at step b3, an idling stop command is given to the engine ECU 3, 13 and control returns to step b1. If it is determined at step b2 that idling stop is inhibited, idling operation is continued at step b4 and engine stop is indicated by the inhibition indication unit 9 at step b5 and then control returns to step b1.

As described above, the vehicle idling stop control apparatus 1, 11 according to each embodiment includes the load monitor unit 7, 17 and the control unit 8, 18 for controlling whether or not the vehicle engine 2 is to be continued to operate in the idling state. The control unit 8, 18 inhibits idling stop if the value of the added-up load Q(t) exceeds the predetermined inhibition determination value Z based on the added-up load Q(t) indicating the run load history calculated by the load monitor unit 7, 17 monitoring the run load of the engine 2. If the time period in which the run load is high is prolonged, idling stop is inhibited, so that the idling operation can be continued for promoting cooling of the engine 2 for avoiding the state of an abnormal high temperature to prevent the engine from overheating.

The vehicle idling stop control apparatus 1, 11 also includes the inhibition indication unit 9 for indicating that idling stop is being inhibited when idling stop is inhibited by the control unit 8, 18 and operation of the engine 2 is continued. Since the inhibition indication unit 9 indicates that idling stop is being inhibited, the vehicle driver, etc., can understand that it is not incapability of stopping idling because of a system failure, etc., and the driver, etc., can be given no insecure feeling.

Figure 6:
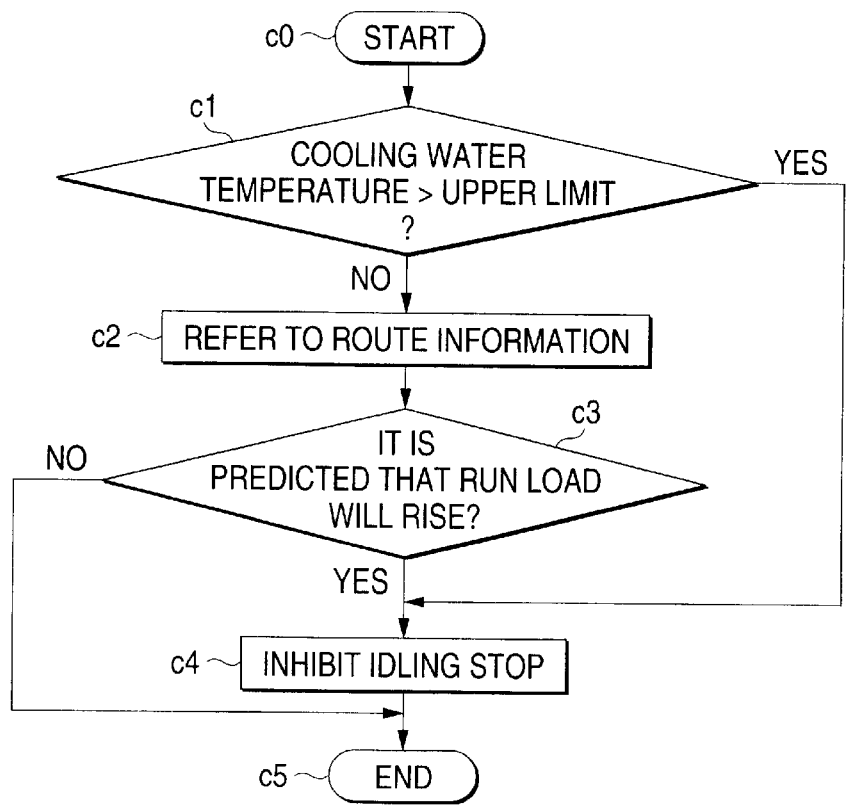
FIG. 6 is a flowchart to show an idling stop inhibition determination procedure according to the embodiments in FIGS. 1 and 2.

FIG. 6 shows a control procedure for more reliably preventing the engine 2 from overheating based on the cooling water temperature of the engine 2 detected by the cooling water temperature sensor 6 shown in FIGS. 1, 2 and information provided by the navigation system 10. The control procedure can be contained in the determination at step b2 in FIG. 5.

The procedure is started at step c0. At step c1, whether or not the cooling water temperature exceeds the upper limit temperature. If it is not determined that the cooling water temperature exceeds the upper limit temperature, route information provided by the navigation system 10 is referenced at step c2. At step c3, a determination is made as to whether or not it is predicted that the run load will rise on the predicted route from the current position of the vehicle based on the route information. If it is predicted that the run load will rise or if it is determined at step c1 that the cooling water temperature already exceeds the upper limit value, idling stop is inhibited at step c4. If it is not determined at c3 that it is predicted that the run load will rise or execution of step 4 terminates, the procedure is terminated at step c5.

In FIGS. 1 and 2, the cooling water temperature sensor 6 detects the temperature of the cooling water of the engine 2. However, when the engine 2 is cooled using a fluid different from cooling water, such as oil or air, a sensor for detecting the temperature of the fluid may be provided. In the control in FIG. 6, the control unit 8, 18 inputs the temperature of the cooling fluid detected by the cooling water temperature sensor 6 as a temperature sensor and inhibits idling stop of the engine 2 not only when the temperature exceeds the preset upper limit temperature, but also if it is predicted that the temperature will rise exceeding the upper limit temperature. The temperature sensor detects the temperature of the cooling fluid and if it is predicted that the detected temperature will rise exceeding the predetermined upper limit temperature, idling stop of the engine is inhibited, so that, even if the engine load rises, it can be made hard to enter the state of an abnormal high temperature.

As described above, according to the invention, when the added-up value of the run load exceeds the predetermined inhibition determination value based on the run load history calculated as the run load of the engine is monitored, idling stop is inhibited, so that the idling operation can be continued for promoting cooling of the engine for avoiding the state of an abnormal high temperature to prevent the engine from overheating. Since whether or not idling stop is to be inhibited is determined based on the added-up value of the run load, idling stop can be controlled appropriately considering the necessity for cooling the engine.

According to the invention, the fact that idling stop is being inhibited is indicated, so that the vehicle driver, etc., can understand that it is not incapability of stopping idling because of a failure of the idling stop control apparatus, etc., and the driver, etc., can be given no insecure feeling.

According to the invention, if it is predicted that the temperature of the cooling fluid such as engine cooling water will rise exceeding the predetermined upper limit temperature, idling stop of the engine is inhibited, so that even if the engine load rises, it can be made hard to enter the state of an abnormal high temperature.

What is claimed is:

1. A vehicle idling stop control apparatus for controlling whether or not idling stop of an engine of a vehicle is to be inhibited, the vehicle idling stop control apparatus comprising:

a load monitor unit for monitoring run load of the engine and calculating a run load history; and a control unit for adding up the run load based on the run load history calculated by the load monitor unit and inhibiting idling stop when the added-up value exceeds a predetermined inhibition determination value.

2. The vehicle idling stop control apparatus according to claim 1, further comprising an inhibition indication unit for indicating that idling stop is being inhibited when operation of the engine is continued in a state in which idling stop is inhibited by the control unit.

3. The vehicle idling stop control apparatus according to claim 1, further comprising a temperature sensor for detecting a temperature of a cooling fluid of the engine, wherein the control unit is inputted the temperature of the cooling fluid detected by the temperature sensor and inhibits idling stop of the engine when it is predicted that the temperature will rise exceeding a preset upper limit temperature.

4. The vehicle idling stop control apparatus according to claim 2, further comprising a temperature sensor for detecting a temperature of a cooling fluid of the engine, wherein the control unit is inputted the temperature of the cooling fluid detected by the temperature sensor and inhibits idling stop of the engine when it is predicted that the temperature will rise exceeding a preset upper limit temperature.

* * * * *